(12) United States Patent
Tamminga

(10) Patent No.: US 6,969,191 B2
(45) Date of Patent: Nov. 29, 2005

(54) LINKAGE MECHANISM FOR A VERTICAL MIXER

(75) Inventor: Jacob R. Tamminga, Orton (CA)

(73) Assignee: Jay-Lor International Inc., Orton ( * ) Notice: Subject to any disclaimer, the term of this patent is extended or adjusted under 35 U.S.C. 154(b) by 204 days.

(21) Appl. No.: 10/666,038

(22) Filed: Sep. 22, 2003

(65) Prior Publication Data

US 2005/0063249 A1 Mar. 24, 2005

(51) Int. Cl.$^7$ ................................................ B01F 7/24
(52) U.S. Cl. ...................... 366/192; 366/297; 366/314; 366/323; 366/603; 241/101.761
(58) Field of Search ........................ 366/192, 297–301, 366/314, 318, 323, 603; 241/101.76, 101.761, 241/101.8, 260.1, 261.1, 605

(56) References Cited

U.S. PATENT DOCUMENTS

| | | |
|---|---|---|
| 3,346,240 A | 10/1967 | Lavelle et al. |
| 3,552,722 A | 1/1971 | Sutter |
| 3,749,370 A | 7/1973 | Clech et al. |
| 3,831,818 A | 8/1974 | Dumont |
| 4,049,244 A | 9/1977 | Hedrich |
| 4,413,789 A | 11/1983 | Rienecker et al. |
| 4,480,927 A | 11/1984 | Peat et al. |
| 4,607,802 A | 8/1986 | Lamort |
| 4,720,047 A | 1/1988 | Knight et al. |
| 4,725,007 A | 2/1988 | Chupka |
| 4,949,916 A | 8/1990 | Wroblewski |
| 4,984,900 A | 1/1991 | Faccia |
| 5,020,918 A | 6/1991 | Faccia |
| 5,082,188 A | 1/1992 | Urich |
| 5,139,314 A | 8/1992 | Deckler |
| 5,240,321 A | 8/1993 | Miller |
| 5,294,064 A | 3/1994 | Faccia |
| 5,429,436 A | 7/1995 | Stone |
| 5,456,416 A | 10/1995 | Hartwig |
| 5,462,354 A | 10/1995 | Neier |
| 5,549,384 A | 8/1996 | Reynolds |
| 5,553,937 A | 9/1996 | Faccia |
| 5,553,938 A | 9/1996 | Faccia |
| 5,615,839 A | 4/1997 | Hartwig |
| 5,647,665 A | 7/1997 | Schuler |
| 5,772,131 A | 6/1998 | Dal Maso |
| 5,823,449 A | 10/1998 | Kooima et al. |
| 5,863,122 A | 1/1999 | Tamminga |
| 6,328,465 B1 | 12/2001 | Tamminga |
| 6,409,376 B1 | 6/2002 | Knight |
| 6,409,377 B1 | 6/2002 | Van Der Plas |
| 6,467,945 B1 | 10/2002 | Albright et al. |
| 6,834,989 B2 | 12/2004 | Tamminga |
| 6,890,092 B2 * | 5/2005 | Tamminga .................. 366/314 |
| 2003/0223308 A1 * | 12/2003 | Knight ........................ 366/314 |
| 2004/0008575 A1 * | 1/2004 | Albright et al. ............. 366/299 |

* cited by examiner

Primary Examiner—David Sorkin

(57) ABSTRACT

A vertical mixer has a mixing chamber with a vertical auger rotatably mounted herein. The mixing chamber has a side wall and a floor. The side wall has an opening therein that is closable by a door. The door is constructed to be opened and closed by hydraulic cylinder connected in parallel to a linkage. The linkage includes two or more elongate members pivotally connected to one another, and the hydraulic cylinder is pivotally connected between the elongate members.

5 Claims, 13 Drawing Sheets

LINKAGE MECHANISM FOR A VERTICAL MIXER

BACKGROUND OF THE INVENTION

1. Field of the Invention

This invention relates to an hydraulic cylinder and linkage connected in parallel to open and close a door of a vertical mixer.

2. Description of the Prior Art

Vertical feed mixers of various forms are known and, in particular, vertical feed mixers for mixing round bales of hay or haylage of any size, including large and small bales with other animal feed stuffs including corn, silage, commodities, by-products and concentrates are known. Previous vertical feed mixers have a mixing chamber with a vertically mounted auger having a helically shaped expanding periphery that is narrowest at a top and increases in size towards a base. The mixing chamber has a door in a side wall thereof. The door has a closed position and an open position and is used to allow feed that has been mixed to exit the mixer. With previous mixers, when the mixing process has been completed, the door is moved to the open position and the feed that has been mixed exits from the mixing chamber through the door. The door is opened and closed by an hydraulic cylinder that is controlled to contract and extend as desired.

SUMMARY OF THE INVENTION

It is an object of the present invention to provide a vertical feed mixer having a door that is constructed to be opened and closed by an hydraulic cylinder connected in parallel with a linkage.

A vertical mixer has a mixing chamber containing a substantially vertically rotatable auger having a generally helical flight that is tapered to converge from bottom to top. There are power means to rotate the auger about a longitudinal center axis. The mixing chamber has a floor and a side wall. The side wall has an opening therein, the opening being sized and located to be closed by a door. The door has a closed position and an open position. There is an hydraulic cylinder connected in parallel with a linkage to open and close the door.

A vertical mixer comprises a mixing chamber containing a substantially vertical rotatable auger having a generally helical flight that is tapered to converge from bottom to top. There are power means to rotate the auger about a longitudinal center axis. The mixing chamber has a floor and a side wall, the side wall having an opening therein that is sized and located to be closed by a door. There is at least one hinge located between the door and the side wall and an hydraulic cylinder is connected in parallel with a linkage to open and close the door. The linkage has two elongate members, the two elongate members being a first member and a second member. Each member has an inner end and an outer end, the two elongate members being pivotally connected to the mixing chamber at the outer end of the first member. The second member is pivotally connected to the door at the outer end of the second member. The hydraulic cylinder is pivotally connected between the first member and the second member.

BRIEF DESCRIPTION OF THE DRAWINGS

In FIGS. 1 and 2, there is shown a mixer 2 having a single auger 4 with a tapered wall 6 of a mixing chamber 8. The tapered wall 6 converges from top to bottom. The chamber 8 has an open top and an outlet door 10 that is in a closed position. The door 10 is connected to the mixing chamber by hinges 11 and is operable between a closed position and an open position (not shown) by means of an hydraulic cylinder 12. The door can be designed to be opened and closed in various ways. The door has a segment 13 along a bottom thereof that forms part of a floor 15 of the mixing chamber 8 when the door is in the closed position. The mixer 2 has a frame 14 with a tongue 16 and wheels 18. There are two sets 19 of wheels 18 mounted on each side of the mixer 2 (only one set 19 being shown in FIG. 1) Each set 19 has two wheels 18. Each set 19 is affixed to the mixer by a bracket 21. A conveyer 20 is used to move mixed material that exits the door 10 away from the mixer 2. An adjustable baffle 22 located in the wall 6 assists in controlling the degree of cutting that occurs within the mixer. There are two baffles 22 shown in the mixer 2. The tongue 16 has a hitch 13 to connect the mixer to a tractor (not shown). There are two groups 25 of windows 27 extending between a top and bottom of the tapered wall 6.

In FIGS. 3 and 4, a mixer 24 has two augers 4. A side wall 26 of a mixing chamber 28 is vertical. Bulkheads 30 are located within the chamber 28 between the two augers 4. The bulkheads 30 have sloped surfaces and are located in what would otherwise be dead areas of the chamber 28 to prevent materials that are being mixed from coming to rest in the areas where the bulkheads are located. When material strikes the bulkheads 30, the material slides onto a floor 32 of the mixing chamber 28. The mixer 24 has a drive shaft (not shown) that is sized and located to be connected to the power take-off of a tractor (not shown). Those components of FIGS. 3 and 4 that are the same or similar to the components of FIGS. 1 and 2 are described using the same reference numerals as used for FIGS. 1 and 2.

FIG. 5 is a partial top view of the mixer 24 with a front portion of the mixing chamber 28 cut away to show a clear view of part 34 of the auger 4 extending out of said opening during part of each rotation of the auger when the door 10 is in an open position. Part 34 is an outer end of a lowermost flight of the auger 4. The same reference numerals are used in FIG. 5 to describe those components that are identical to the components of FIGS. 3 and 4.

In FIG. 6, there is shown a further embodiment of a vertical mixer where the mixer has sloped sidewalls 36. Those components of FIG. 6 that are the same or similar to components of FIGS. 3 to 5 are described using the same reference numerals. A mixer 38 has a mixing chamber 40 with a door 10 in the closed position. A vertical window 42 is located in the sidewall 36. The mixer 38 has two sets 44 of four wheels 18 in each set, there being one set 44 on either side of the mixer. A bracket 46 is affixed to an underside of the mixing chamber 40. The bracket 46 supports a pivot bar 48. A pivot bracket 50 pivots about the pivot bar 48. Each set 44 of wheels 18 pivots about the pivot bar 48.

In FIG. 7, there is shown a partial enlarged perspective view of the mixer 2 of FIG. 1 with the door 10 in an open position. In FIG. 8, there is shown a partial side view of the mixer 2 of FIG. 1 with the door 10 in an open position. In FIG. 9, there is shown a partial enlarged side view of the mixer 2 of FIG. 1 with the door 10 in a closed position. The same reference numerals are used in FIGS. 7, 8 and 9 as those used in FIGS. 1 and 2 for those components that are identical.

Figure 1:
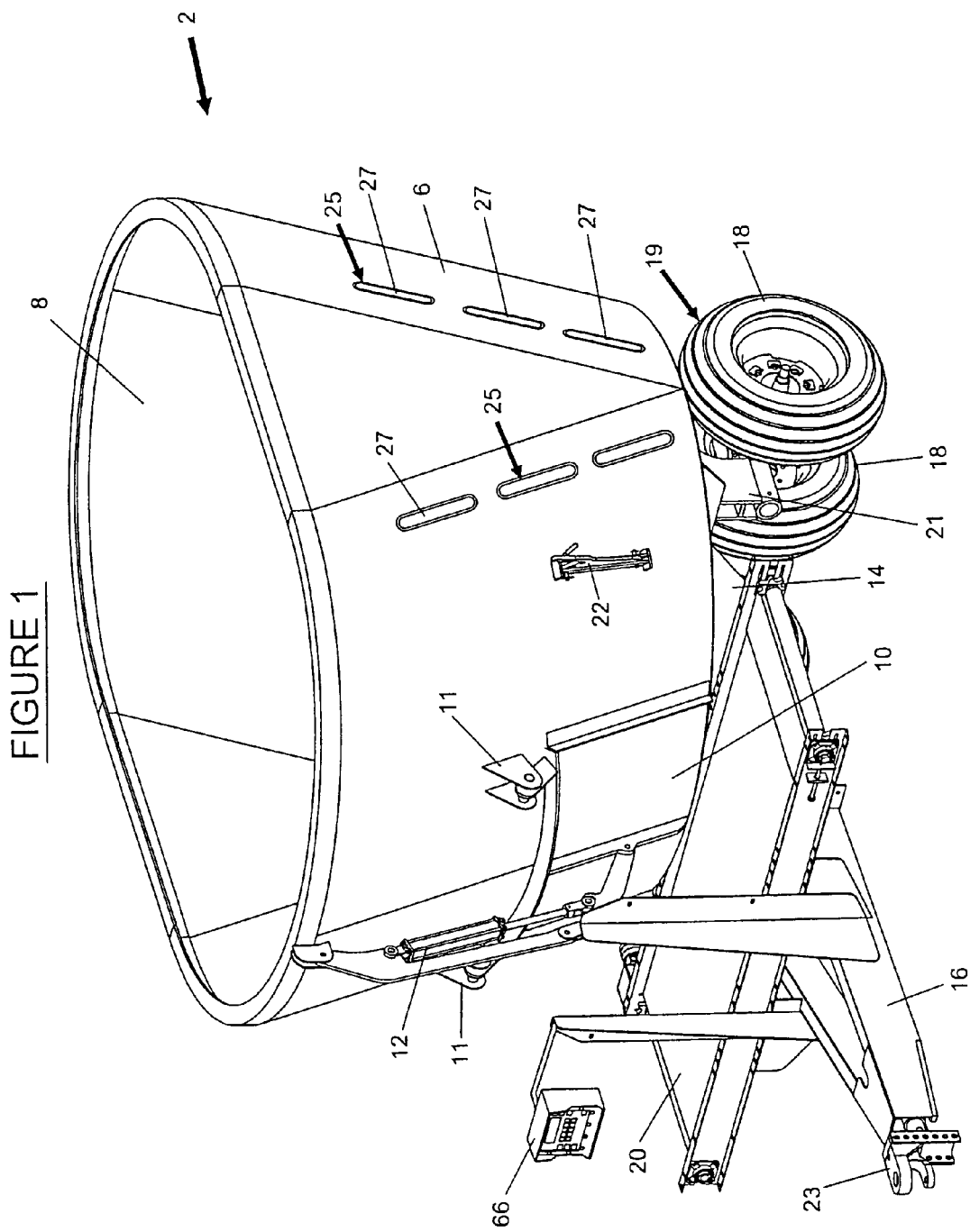
FIG. 1 is a perspective view of a single auger vertical mixer.
Figure 2:
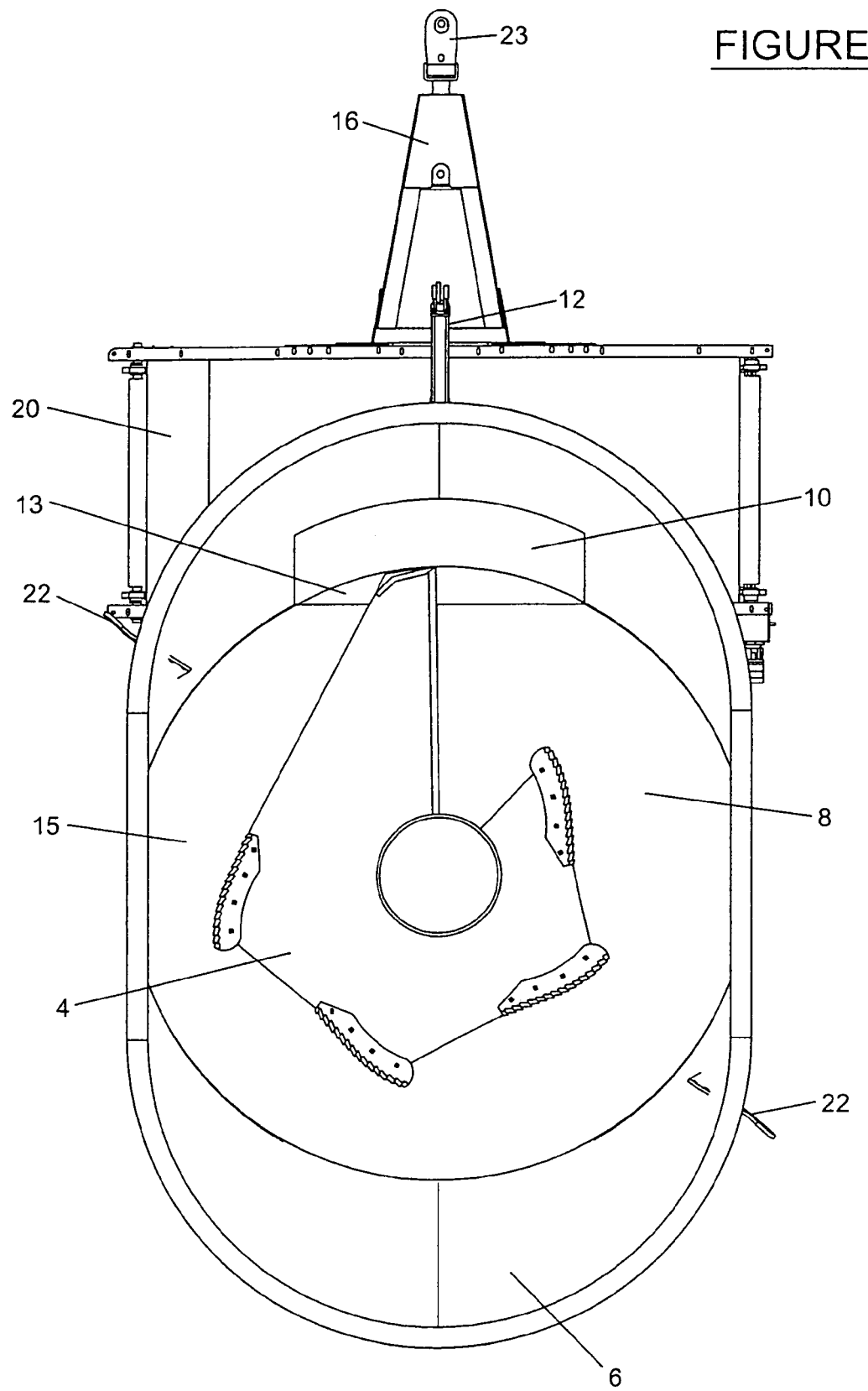
FIG. 2 is a top view of the mixer of FIG. 1.
Figure 3:
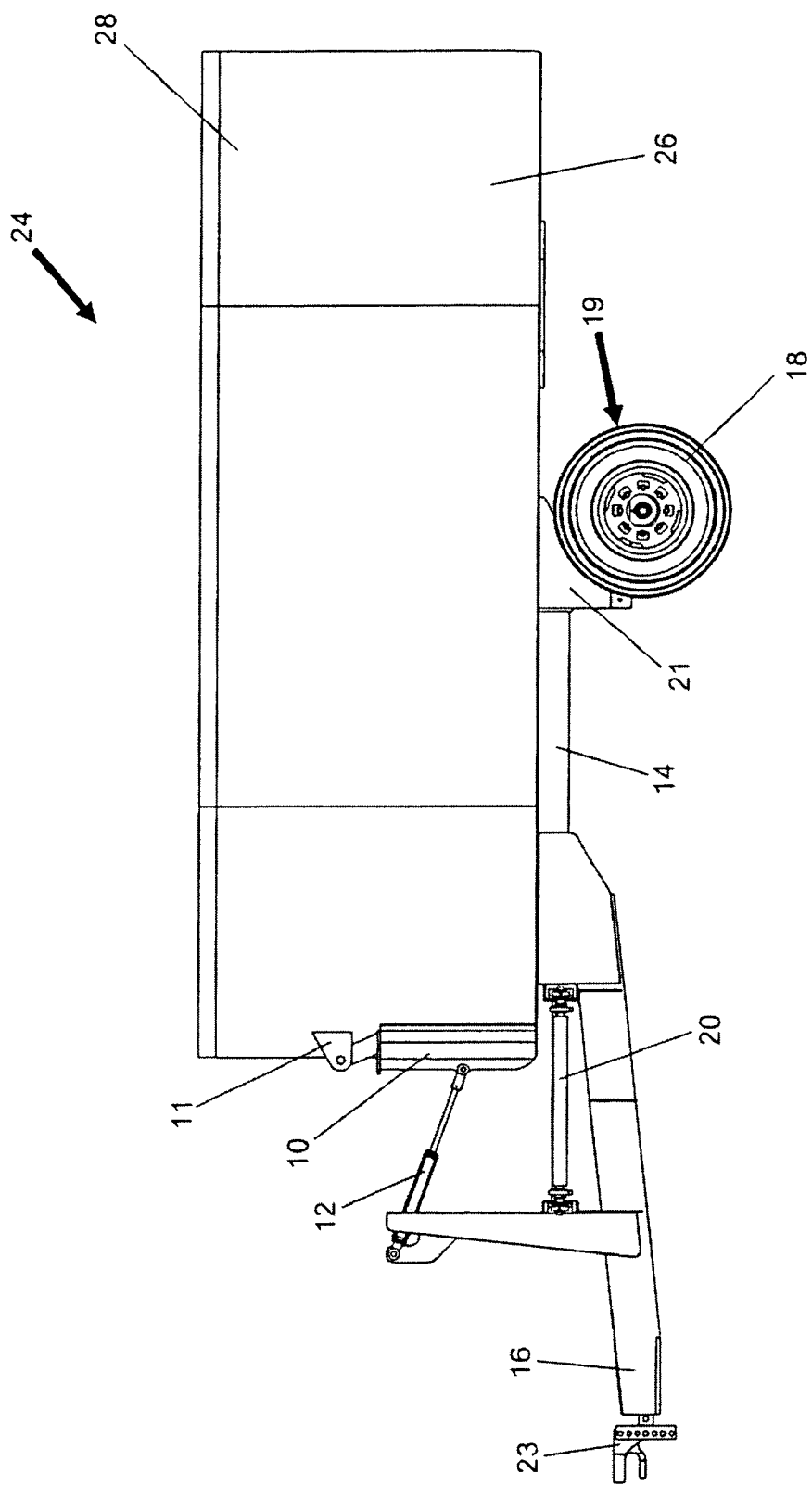
FIG. 3 is a side view of a double auger mixer.
Figure 4:
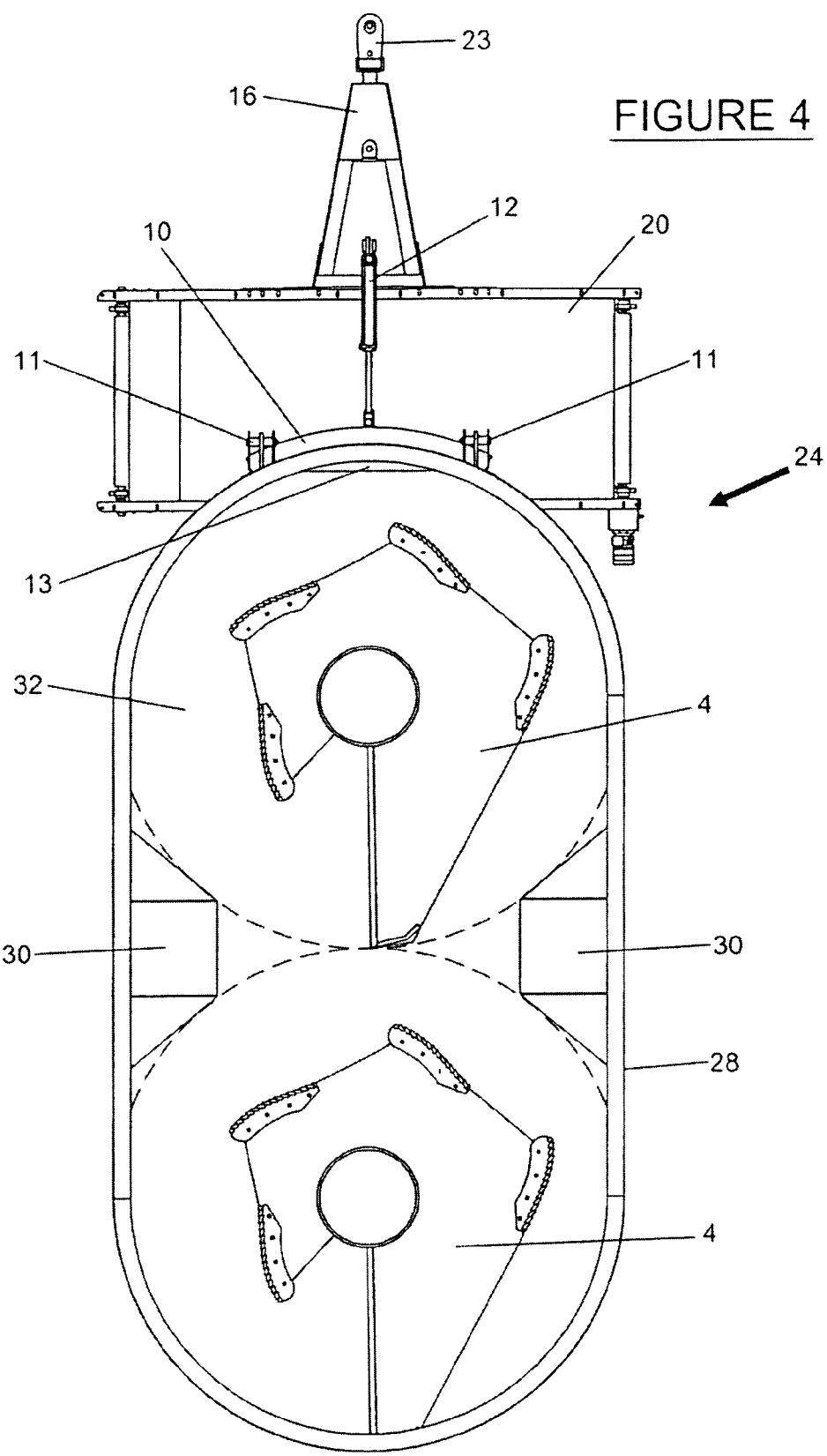
FIG. 4 is a top view of the mixer of FIG. 3.
Figure 5:
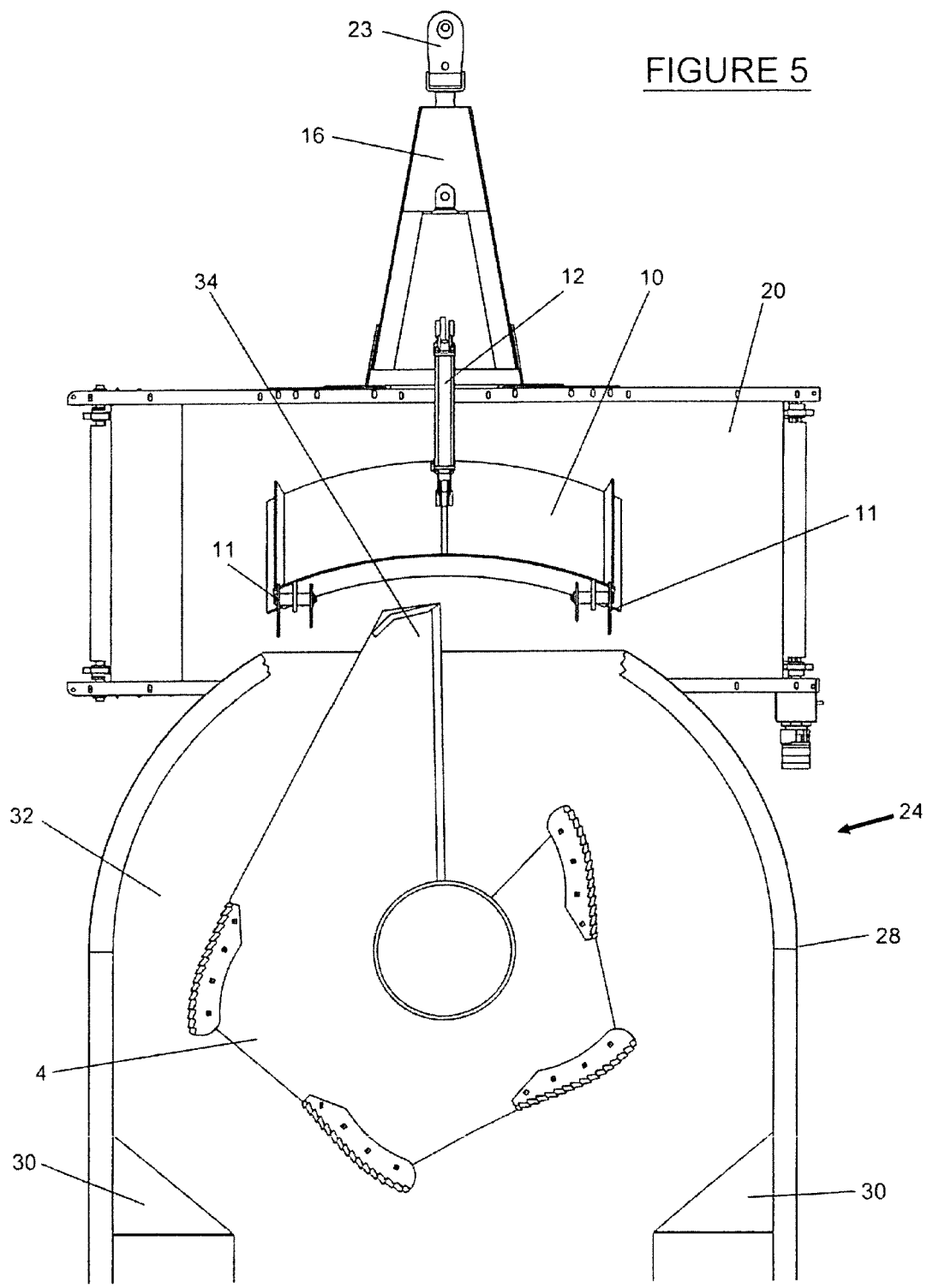
FIG. 5 is a partial top view of the mixer of FIG. 3 where the door is in an open position and a front portion of the mixer is cut away.
Figure 6:
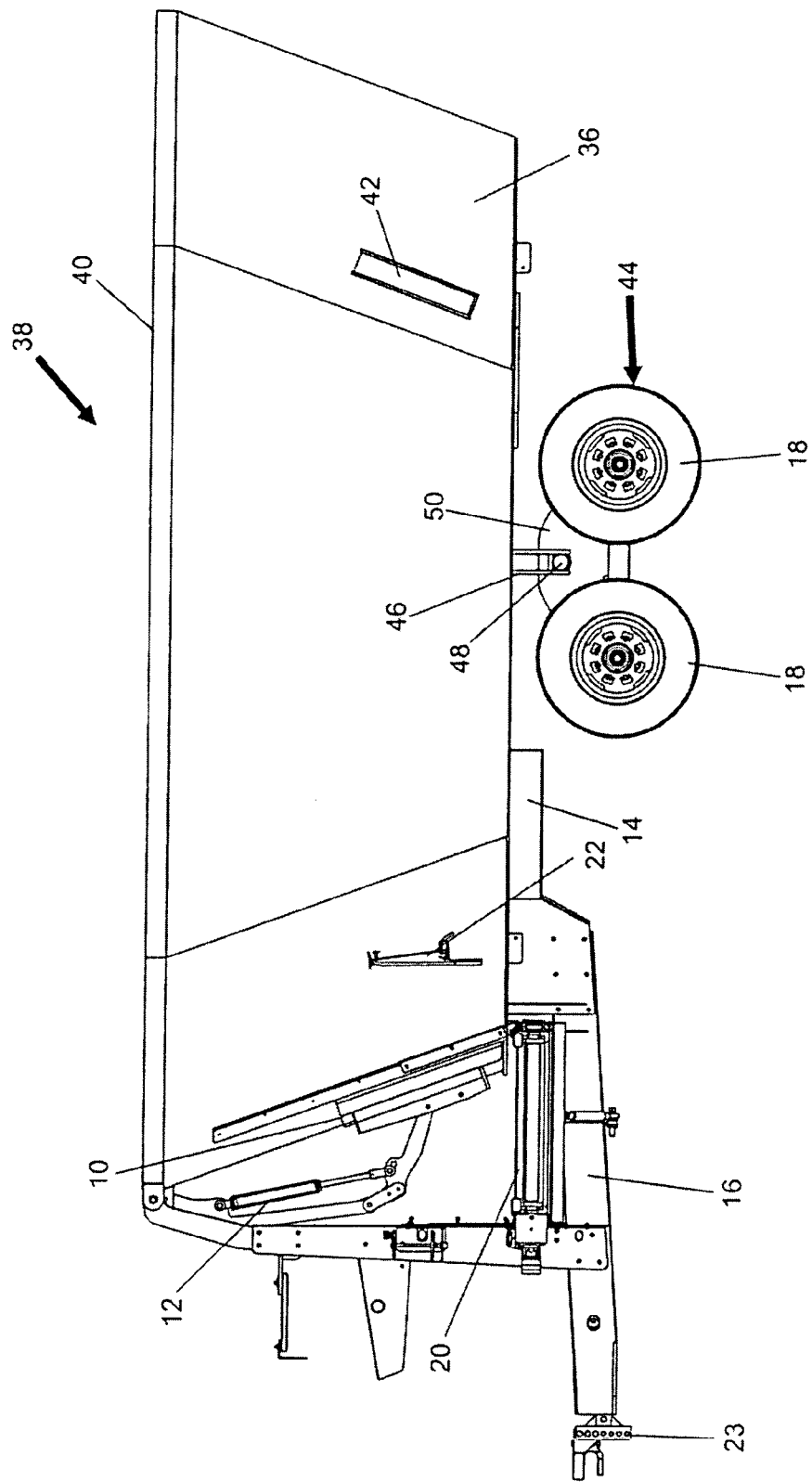
FIG. 6 is a side view of a further embodiment of a mixer with a door in a closed position.
Figure 7:
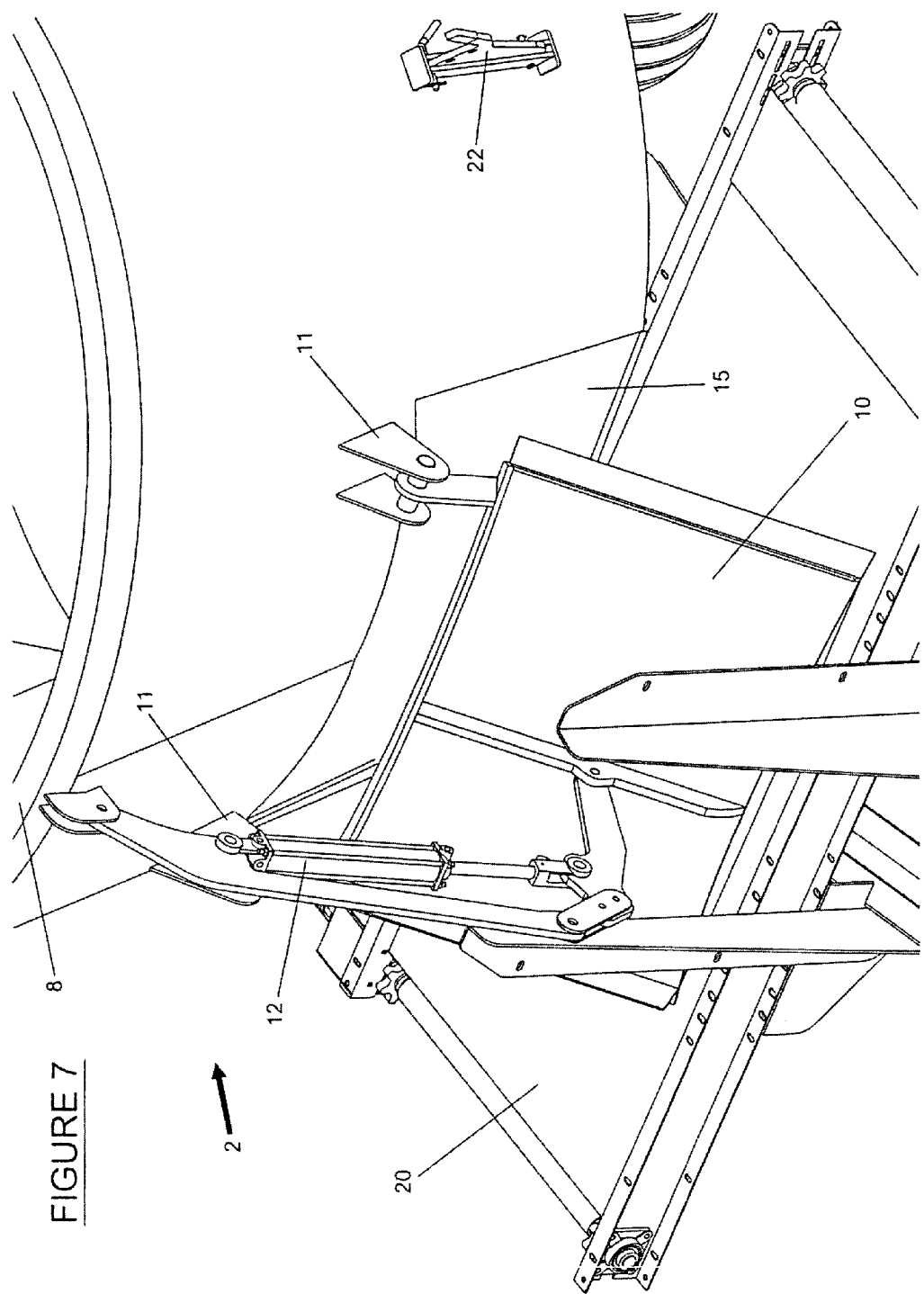
FIG. 7 is an enlarged perspective view of the mixer of FIG. 1 with the door in an open position.
Figure 8:
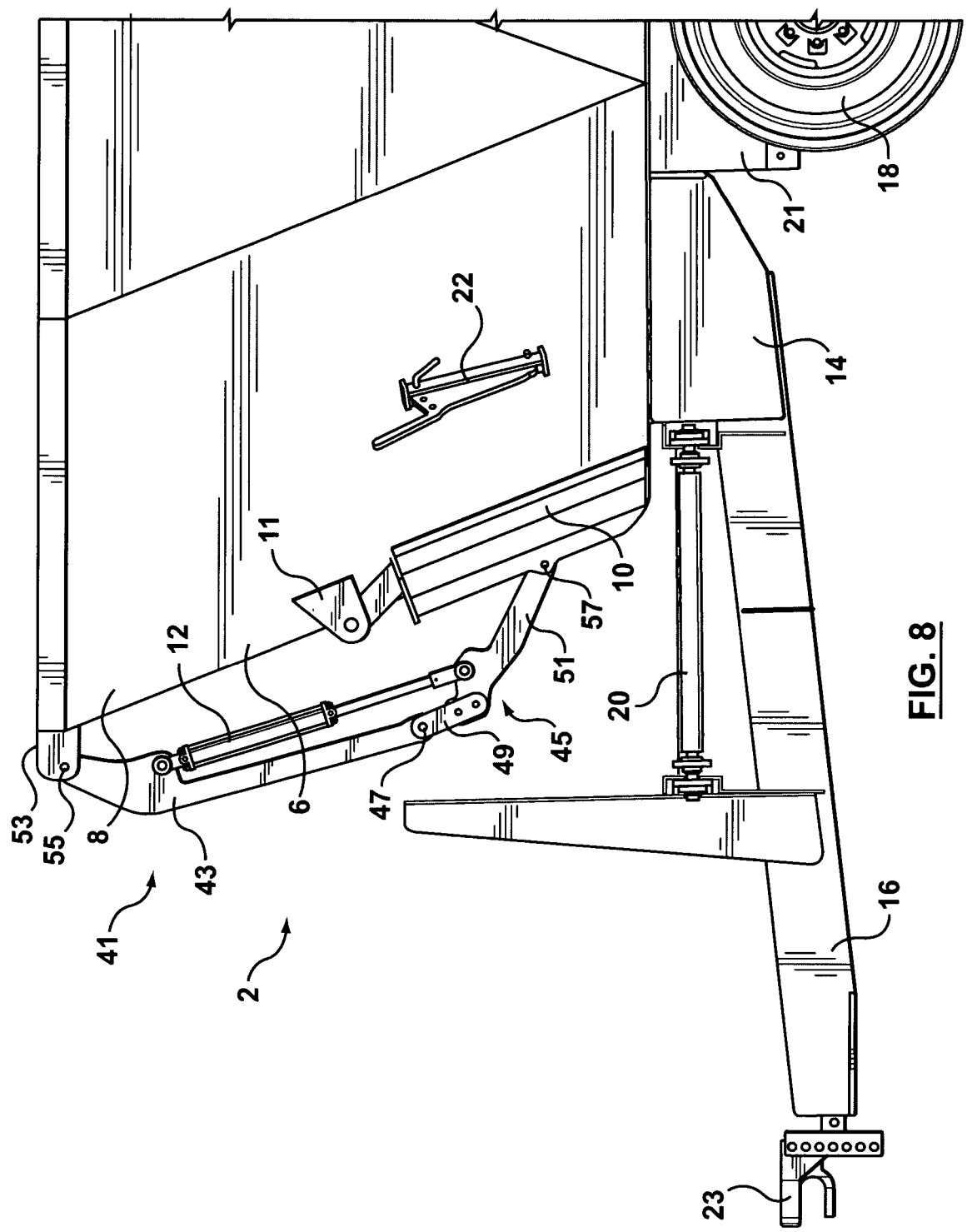
FIG. 8 is a partial side view of the mixer of FIG. 1 with the door in a closed position.
Figure 9:
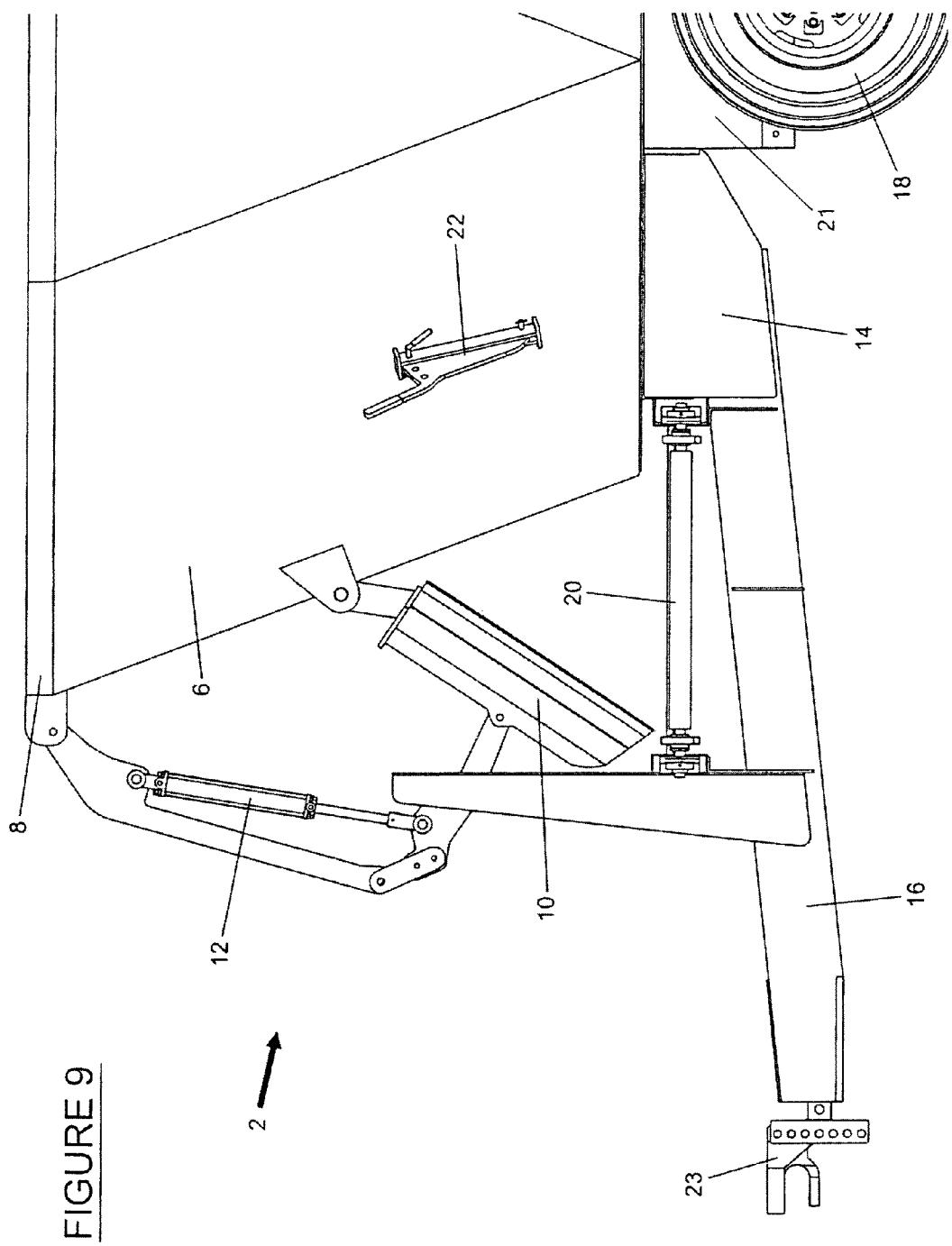
FIG. 9 is a partial side view of the mixer of FIG. 1 with the door in an open position.

As can be seen in FIGS. 6, 7, 8 and 9, the hydraulic cylinder 12 is connected in parallel with a linkage 41 to open and close the door 10. The linkage 41 has a first elongate member 43 and a second elongate member 45 that are pivotally connected to one another at a pivot point 47. The second elongate member 45 can be one piece. However, as shown, the second elongate member 45 is made from a third elongate member 49 and a fourth elongate member 51. The third member 49 is fixedly secured to the fourth member 51 and the third and fourth members do not pivot relative to one another. Thus, the third and fourth members can be replaced with one member having the same shape as the third and fourth members. The first and second elongate members each have an inner end and an outer end. The inner ends are pivotally connected at the pivot point 47. The outer end of the first elongate member is connected to a retention bracket 53 (the bracket 53 being attached to the mixing chamber 8) at a pivot point 55. The outer end of the second elongate member 45 is pivotally connected to the door 10 at a pivot point 57. The hydraulic cylinder is pivotally connected between the first member 43 and the second member 45 in parallel to the linkage 41. An advantage of using the hydraulic cylinder in parallel with the linkage is that a much smaller hydraulic cylinder can be used to open and close the door than would be required if the cylinder was not connected in parallel with the linkage. The smaller cylinder can result in a significant cost saving. All of the reference numerals have not been inserted for all of the linkage components in FIG. 6 so as not to clutter the drawing.

Figure 10:
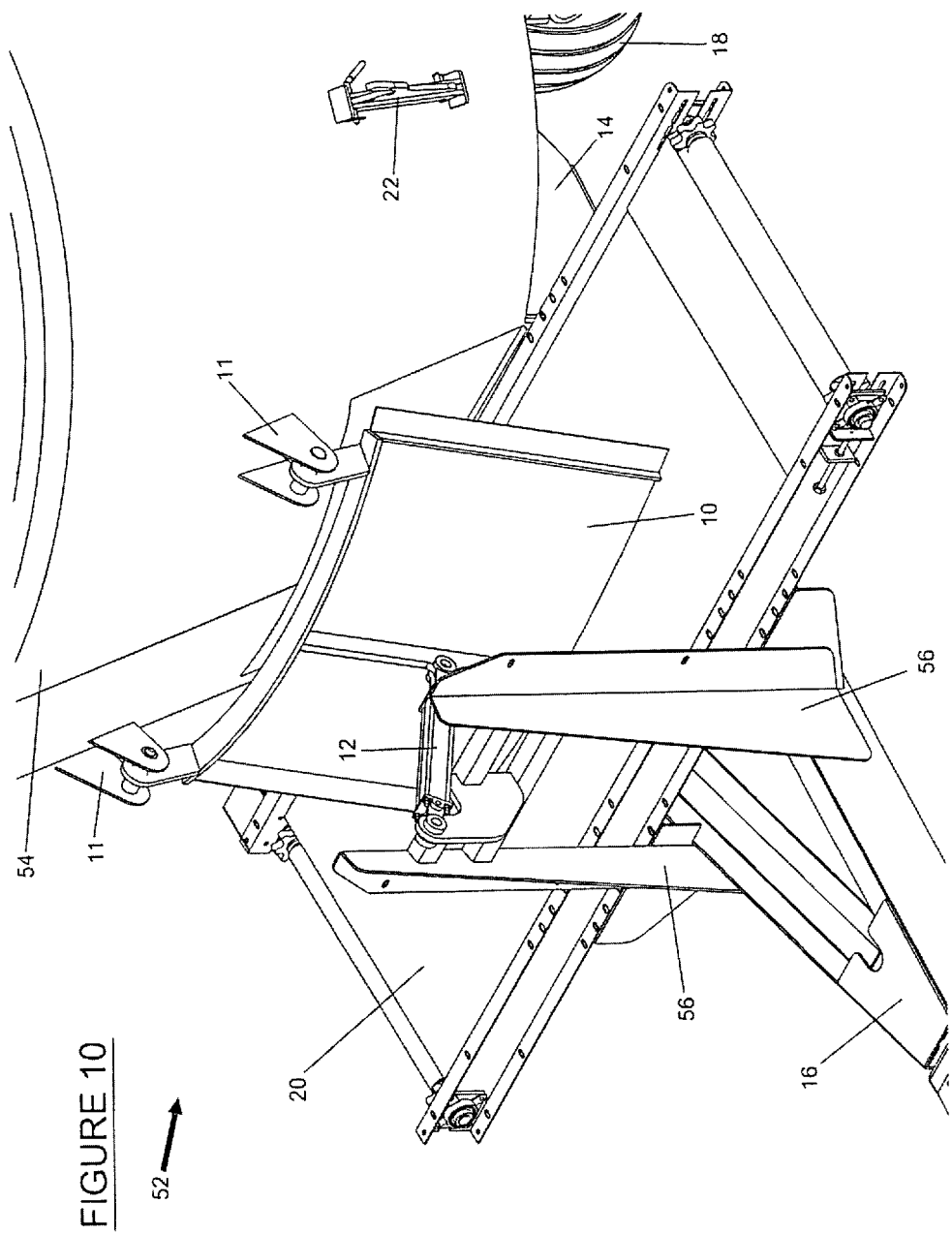
FIG. 10 is a partial perspective view of a further embodiment of a mixer having a door in an open position.

In FIG. 10, there is shown an enlarged partial perspective view of a further embodiment of a mixer 52 having a mixing chamber 54 with a door 10 in an open position. The mixer 52 is virtually identical to the mixer 2 except that the hydraulic cylinder 12 to open and close the door 10 is connected to two vertical posts 56 extending upward from the tongue 16.

Figure 11:
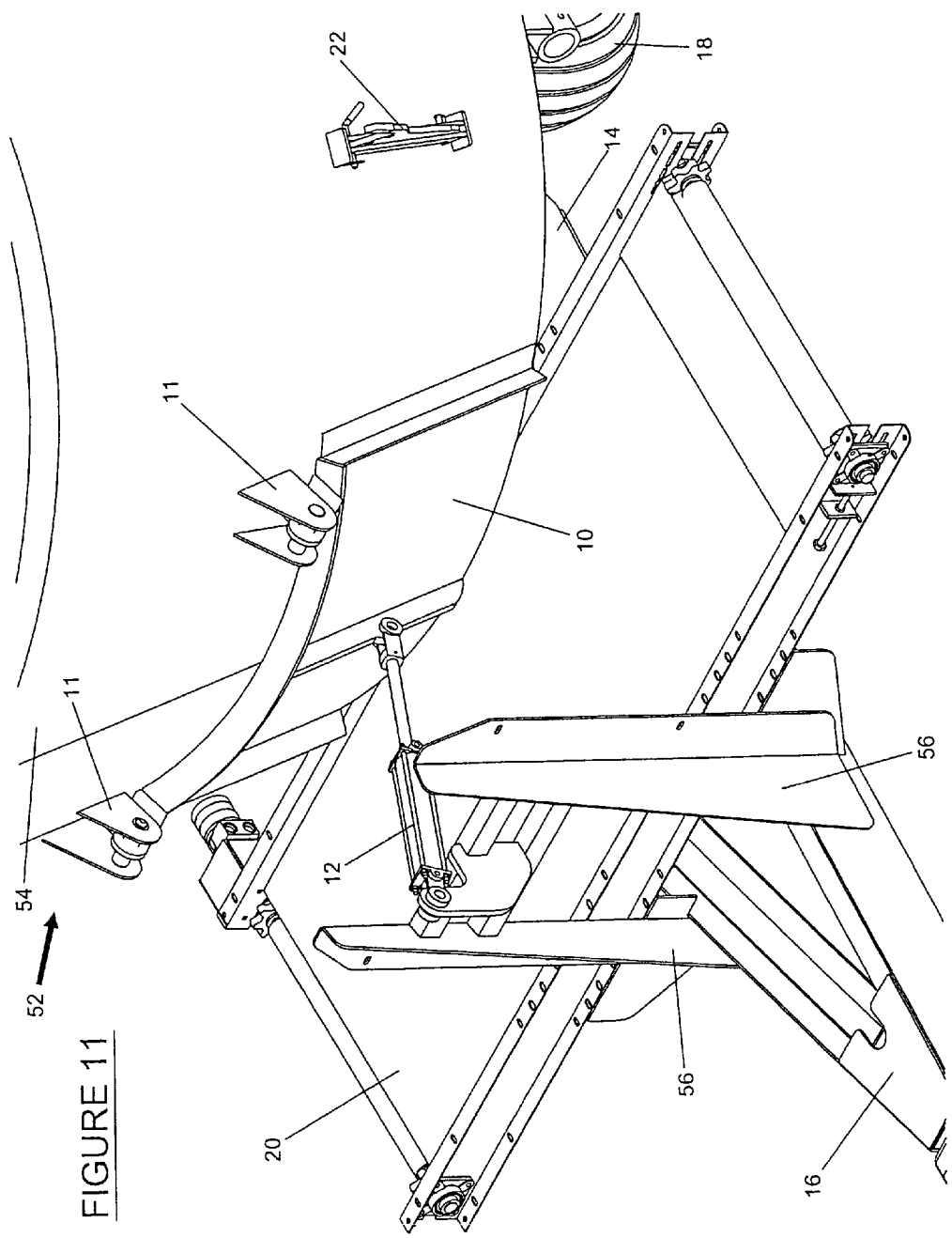
FIG. 11 is a partial perspective view of a mixer with the door in a closed position.

In FIG. 11, there is shown an enlarged partial perspective view of the mixer 52 with the door 10 in a closed position.

Figure 12:
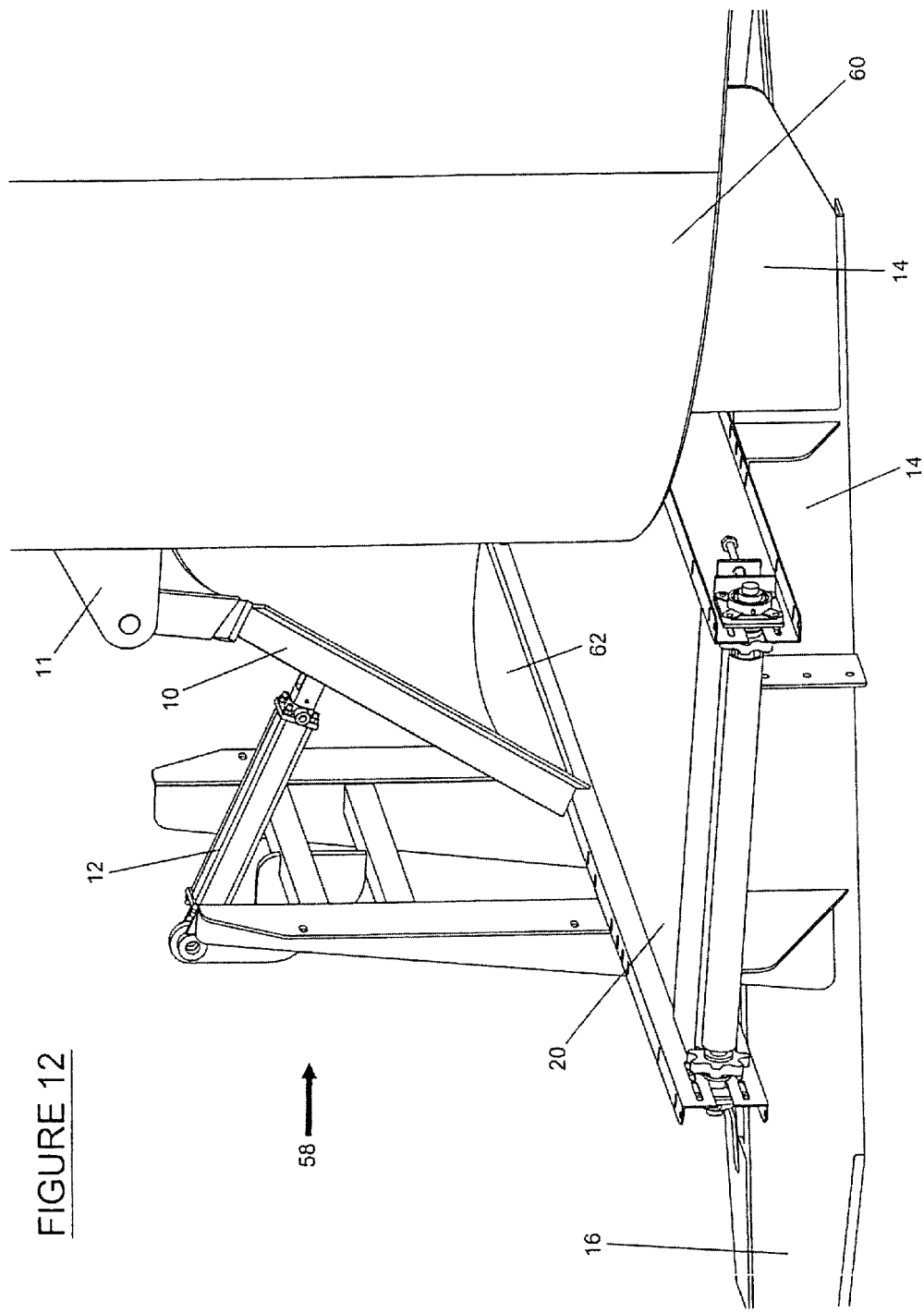
FIG. 12 is a perspective view of an inside of a door.

In FIG. 12, there is shown an enlarged perspective view of a further embodiment of a mixer 58 having a mixing chamber 60 with vertical side walls 62. The door 10 of the mixer 60 opens and closes in exactly the same manner as the door 10 of the mixer 52 shown in FIGS. 10 and 11. An inside view of the door 10 is shown and it can be seen that the door has a segment 62 extending across a bottom thereof.

Figure 13:
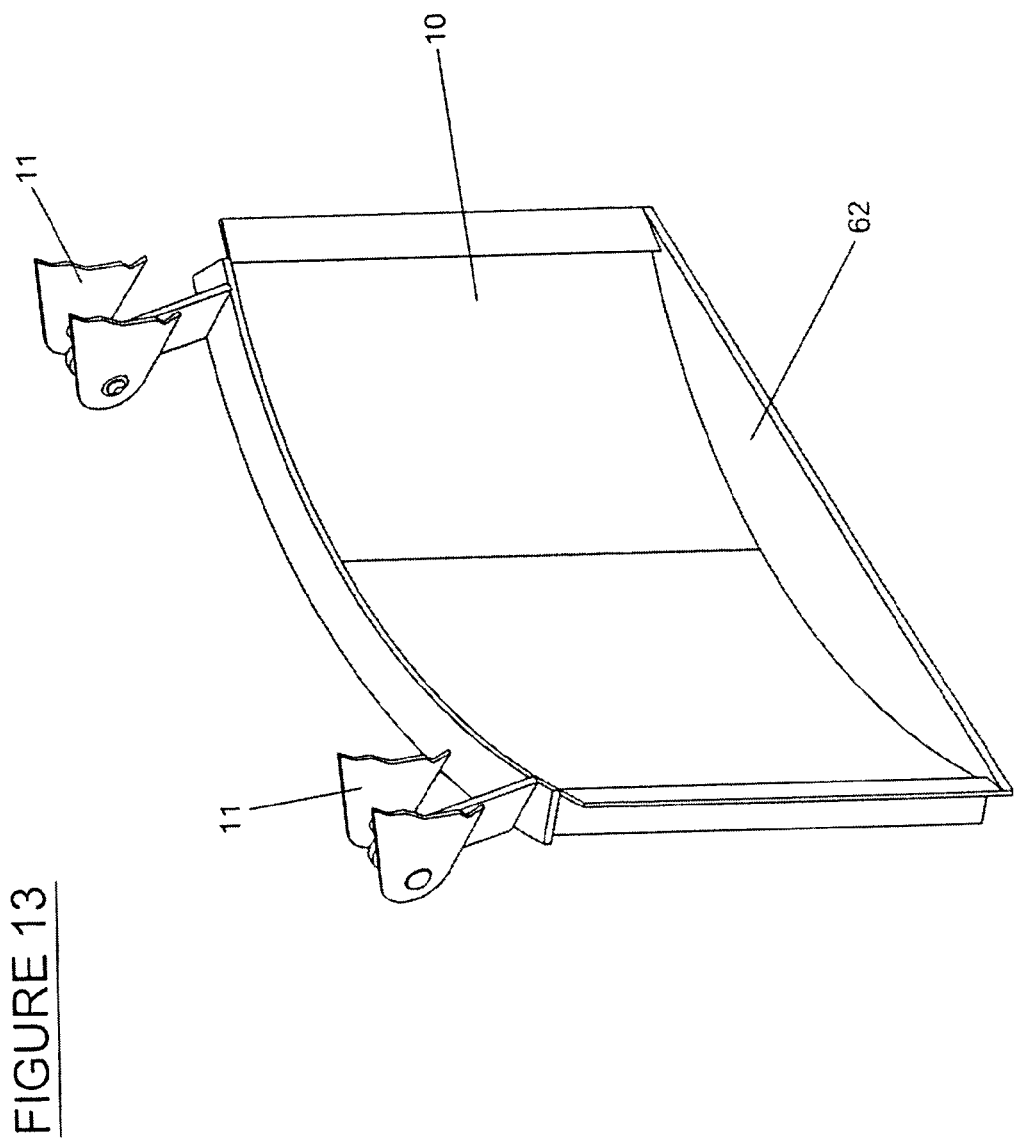
FIG. 13 is a partial perspective view of an inside of a door in an open position.

In FIG. 13, there is shown a perspective view of an interior of the door 10 having the segment 62. When the door is in a closed position, the segment 62 forms part of the floor of the mixing chamber with which the door is used. Preferably, the segment is substantially flush with the floor of the mixing chamber.

While the vertical mixer described in the drawings has a door that includes part of the floor of the mixing chamber, the present invention can be used with a door of a mixing chamber where the door does not include part of the floor.

When an hydraulic cylinder connected in parallel with the linkage is used to open and close a door of a vertical feed mixer, a much smaller hydraulic cylinder can be used to open and close the door than is required when an hydraulic cylinder is used without a linkage connected in parallel. Hydraulic cylinders are relatively expensive components and a smaller cylinder can result in significant cost savings over a larger cylinder. Preferably, an hydraulic cylinder can be substantially half as large when used with a linkage connected in parallel than is required when an hydraulic cylinder is used alone.

I claim:

1. A vertical mixer comprising:
   a mixing chamber containing a substantially vertical rotatable auger having a generally helical flight that is tapered to coverge from bottom to top, with power means to rotate said auger about a longitudinal center axis;
   said mixing chamber having a floor and a side wall, said side wall having an opening therein;
   said opening being sized and located to be closed by a door;
   said door being movable between a closed position and an open position;
   a hydraulic cylinder connected in parallel with a linkage to open and close said door;
   said linkage having at least two elongate members that are pivotally connected to one another; and
   said cylinder being pivotally connected between said members.

2. A vertical mixer as claimed in claim 1 wherein said at least two elongate members comprise a first member and a second member, each said member having an inner end and an outer end, said two elongate members being pivotally connected to one another at said inner end of each member.

3. A vertical mixer as claimed in claim 2 wherein said first member is pivotally connected to said mixing chamber at said outer end of said first member and said second member is pivotally connected to said door at said outer end of said second member.

4. A vertical mixer as claimed in claim 3 wherein said hydraulic cylinder is pivotally connected between said first member and said second member.

5. A vertical mixer as claimed in claim 1 additionally including at least one hinge located between said door and said side wall.

* * * * *

UNITED STATES PATENT AND TRADEMARK OFFICE
CERTIFICATE OF CORRECTION

PATENT NO. : 6,969,191 B2
DATED : November 29, 2005
INVENTOR(S) : Jacob R. Tamminga It is certified that error appears in the above-identified patent and that said Letters Patent is hereby corrected as shown below:

<u>Column 4,</u>
Line 30, replace "coverge" with -- converge --.

Signed and Sealed this

Second Day of May, 2006

JON W. DUDAS
*Director of the United States Patent and Trademark Office*